US006606242B2

(12) United States Patent
Goodman et al.

(10) Patent No.: US 6,606,242 B2
(45) Date of Patent: Aug. 12, 2003

(54) UNIVERSAL ADAPTER BRACKET FOR MOUNTING ELECTRONIC DEVICES

(75) Inventors: Walter A. Goodman, Raleigh, NC (US); Dean Frederick Herring, Youngsvill, NC (US); John Robert Kirksey, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 09/931,224

(22) Filed: Aug. 16, 2001

(65) Prior Publication Data

US 2003/0095377 A1 May 22, 2003

(51) Int. Cl.[7] .................................................. G06F 1/16
(52) U.S. Cl. ........................ 361/685; 248/633; 248/636; 312/223.2; 369/75.1
(58) Field of Search ................................ 361/685, 684, 361/683; 248/633–638, 618; 312/223.1, 223.2, 332.1, 333; 369/75.1–82

(56) References Cited

U.S. PATENT DOCUMENTS

| 4,941,841 A | * | 7/1990 | Darden et al. ............... 361/685 |
| 5,124,886 A | | 6/1992 | Golobay ...................... 361/391 |
| 5,596,484 A | | 1/1997 | Suzuki ........................ 361/685 |
| 5,654,873 A | * | 8/1997 | Smithson et al. ............ 361/685 |
| 6,008,984 A | | 12/1999 | Cunningham et al. ....... 361/685 |
| 6,040,980 A | | 3/2000 | Johnson ....................... 361/685 |
| 6,094,342 A | * | 7/2000 | Dague et al. ................ 361/685 |
| 6,122,164 A | | 9/2000 | Liao et al. ................... 361/685 |
| 6,130,817 A | | 10/2000 | Flotho et al. ................ 361/685 |
| 6,498,722 B1 | * | 12/2002 | Stolz et al. .................. 361/685 |

FOREIGN PATENT DOCUMENTS

| JP | 05181565 A | * | 7/1993 | ............. G06F/1/16 |
| JP | 06125184 A | * | 5/1994 | ............. H05K/7/12 |

* cited by examiner

Primary Examiner—Darren Schuberg
Assistant Examiner—Lisa Lea-Edmonds
(74) Attorney, Agent, or Firm—John D. Flynn; Ronald V. Davidge

(57) ABSTRACT

An adapter bracket is configured for mounting a relatively small electronic device, such as a 3½-inch drive device in a bay within a frame structure configured for mounting a relatively large electronic device, such as a 5¼-inch drive device. The relatively small electronic device is mounted either by means of screws extending upward through the bracket into holes within the lower surface of the small drive device, or by means of screws extending through elastomeric grommets, mounted within the adapter bracket, into holes within the sides of the small drive device. The adapter bracket also includes sidewalls that are mounted within the bay in the manner of a standard version of the relatively large electronic device.

25 Claims, 2 Drawing Sheets

UNIVERSAL ADAPTER BRACKET FOR MOUNTING ELECTRONIC DEVICES

BACKGROUND INFORMATION

1. Field of Invention

This invention relates to mounting an electronic device having a first width in a space within a housing for a second electronic device, having a second width, larger than the first width, and more particularly to an adapter bracket for mounting a 3½-inch drive device within a computer structure provided for mounting a larger, 5¼-inch, drive device.

2. Background Information

Computer drive devices, such as hard drives and drives using removable media, typically are configured either to a relatively small, 3½-inch form factor, or to a relatively large, 5¼-inch form factor. In this context, removable media include floppy diskettes, compact disks, and tape cassettes. These form factors determine the width (left to right) and, within a range, the depth (front to rear) of a drive device. The height of drive devices is also varied between half-high and full-high devices.

Many computer systems include structural provisions for additional drive units, which are widely available as accessories to improve computer functions. Since, with the proper adapter, a 3½-inch drive device can be installed in a structure providing for the installation of a 5¼-inch drive device, many of the structures provided for additional drive units are configured for mounting 5¼-inch drive units.

U.S. Pat. No. 5,596,484 describes a mounting device for mounting a first electronic device, such as a 3½-inch drive, having a first box shape in a space of a second electronic device, such as a 5¼-inch drive, which is larger than the first box shape. The mounting device includes first and second channel-shaped brackets mounted in the space for the second electronic device. The first and second brackets have shapes formed by dividing a space portion formed when the first electronic device is arranged in the second box shape by two. Thus, the smaller device is centrally mounted within the space provided for the larger device, with the channel-shaped brackets extending between each side of the smaller device and the adjacent wall of a housing configured to mount the larger device. Each channel-shaped bracket includes a pair of holes for screws attaching the bracket to a side of the smaller device, and a hole pattern for screws attaching the bracket to the adjacent wall of the housing configured to mount the larger device.

U.S. Pat. No. 5,596,484 also describes, as prior art, a mounting device including a single bracket formed as a U-shaped channel having a hole pattern on each of two sides for screws attaching the single bracket to one of the opposing sides of the housing configured to mount the larger device and a pattern of four holes extending through strips in a lower surface of the channel for screws mounting a device by extending into its bottom surface.

U.S. Pat. No. 6,130,817 describes a holding system for electronic modules, particularly such as disk drives, in which the holding system includes a withdrawable outer frame that can be inserted into a drive bay of a computer system. The holding system also includes an inner frame, extending around the sides and rear of the drive. The drive device is mounted to the inner frame by means of four screws surrounded by shock-absorbing grommets within holes in the inner frame. The inner frame is also mounted to the outer frame by means of conventional screws.

What is needed is a mounting device including a single universal adapter bracket extending under a 3½-inch drive within a drive bay configured for mounting a 5¼-inch drive, with the adapter bracket including both a hole pattern for mounting the drive by means of screws extending upward into a bottom surface of the drive, and a pair of flanges positioned to extend along opposite sides of drive module, with holes in the flanges for alternately mounting the drive by means of screws extending inward, into sides of the drive.

SUMMARY OF THE INVENTION

In accordance with a first aspect of the invention, an adapter bracket is provided for mounting a first electronic device, having a first width, in a space in a frame structure for a second electronic device, having a second width, larger than the first width. The adapter bracket includes a platform portion, first and second wall portions, first and second mounting structures, a first hole pattern within the first mounting structure, and a second hole pattern within the second mounting structure. The first and second wall portions extend upward along opposite sides of the platform portion, with outer surfaces of the first and second wall portions being spaced apart by the second width. The first and second mounting structures extend upward from the platform portion between the first and second wall portions. Inner surfaces of the first and second wall portions are spaced apart by the first width. The first pattern of mounting holes is for attaching the first electronic device to the adapter bracket by screws extending through the first pattern of mounting holes into holes within a first side of the first electronic device. The second pattern of mounting holes is for attaching the first electronic device to the adapter bracket by screws extending through the second pattern of mounting holes into holes within a second side of the first electronic device.

The adapter bracket may also include a third mounting structure and a third pattern of mounting holes. The third mounting structure extends along the platform portion between the first and second mounting structures. The third pattern of mounting holes is for attaching the first electronic device to the adapter bracket by screws extending through the third pattern of mounting holes into holes within a lower surface of the first electronic structure.

Preferably, the first and second mounting structures each include grommets composed of elastomeric materials, with mounting holes within the first and second patterns of mounting holes extending through the grommets, and with the inner surfaces of the first and second mounting structures being defined by the inner surfaces of the grommets. Each grommet is preferably mounted in a scalloped hole within a mounting tab forming part of the first or second mounting structure. The scalloped hole has a first arcuate surface of a first radius and a second arcuate surface of a second radius, larger than the first radius. Each of the grommets includes outer peripheral surfaces, extending around opposite ends of the grommet, and a groove extending between the outer peripheral surfaces. Each of the grommets is installed within a corresponding scalloped hole by sliding an outer peripheral surface of the grommet through the second arcuate surface of the corresponding scalloped hole and by sliding the grommet to bring the groove in the grommet into contact with the first arcuate surface of the corresponding scalloped hole.

DETAILED DESCRIPTION OF THE INVENTION

Figure 1:
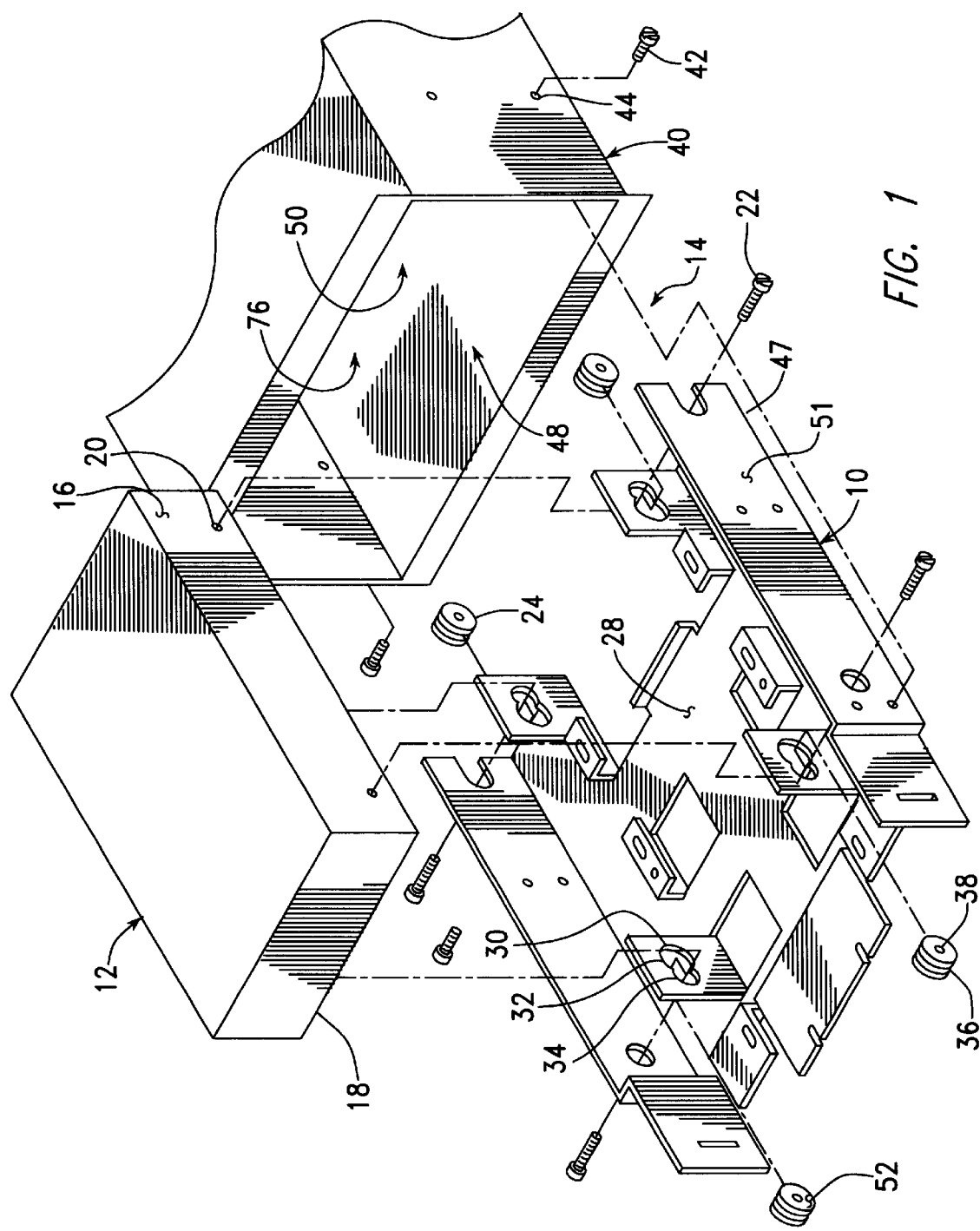
FIG. 1 is a perspective view of an adapter bracket formed in accordance with the present invention, shown in an exploded relationship with a 3½-inch hard drive, with for mounting the hard drive through grommets by its sides, and with a frame structure forming part of a computer system, in which the adapter bracket is installed.

FIG. 1 is a perspective view of an adapter bracket 10, formed in accordance with the present invention, shown in an exploded relationship with a 3½-inch hard drive 12 and elastomeric hardware 14 for mounting the hard drive 12 by its sides 16. The hard drive 12 is of a conventional type, including a frame 18 having threaded holes 20 extending inward from opposite sides 16.

The hard drive 12 is mounted to the adapter bracket 10 by means of four screws 22 extending through grommets 24, which are preferably composed to an elastomeric material having acoustic dampening and shock-absorbing properties. Using the grommets 24 reduces the transmission of acoustic noise from the hard drive 12 through the adapter bracket 10 to the surrounding structure, in order to reduce the level of acoustic noise experienced by a system user during operation of the hard drive 12. Furthermore, the shock-absorbing properties of the grommets 24 may reduce the likelihood of damage to the hard drive 12 in the event that the system holding the hard drive 12 is dropped. The adapter bracket 10 includes a pair of side mounting tabs 26 extending upward from a bracket platform 28 on each of the two opposite sides of the hard drive 12 when the hard drive 12 is installed within the bracket 10. Each of the mounting tabs 26 includes a scalloped hole 30 formed by intersecting circles, with a larger first portion 32 of the hole 30 being formed by a circle having a larger diameter, preferably at least as large as the outer diameter of the grommets 24, and with a smaller second portion 34 of the hole 30 being formed by a circle having a diameter essentially equal to that of a slot 36 within each of the grommets 24.

Thus, a grommet 24 is installed within each scalloped hole 30 by first inserting the grommet 24 within the larger first portion 32 of the scalloped hole 30, so that the slot 36 within the grommet 24 is aligned with the mounting tab 26, and by then sliding the grommet 24 into position within the smaller second portion 34 of the scalloped hole 30. The smaller second portions 34 of the four scalloped holes 30 are aligned with the four threaded holes 20 when the hard drive 12 is in place within the adapter bracket 10, so that, after the four grommets 24 have been installed within the four smaller second portions 34 of the four scalloped holes 30, the hard drive 12 can be fastened into place by inserting the four screws 22 within the holes 38 within the grommets 24 to engage the threaded holes 20 within the hard drive frame 18. The screws 22 may be conventionally threaded, or they may alternately include unthreaded shoulder portions extending within the holes 38 of the grommets 24.

When the hard drive 12 has been installed in this way, direct contact is prevented between the hard drive 12 and the adapter bracket 10, with forces being instead transmitted through the four grommets 24. In this way, the transmission acoustic vibration and shock forces is minimized.

After the hard drive 12 has been installed within the adapter bracket 10 as described above, the adapter bracket 10 is installed within a frame structure 40 forming part of a computing system (otherwise not shown) into which the adapter bracket is installed, to be held in place with a number of screws 42 extending through clearance holes 44 within the frame structure 40 to engage threaded holes 46 within the side walls 47 of the adapter bracket 10. In the example of FIG. 1, the frame structure 40 includes positions for mounting two of the adapter brackets 10, with the adapter bracket 10 being installed in a lower bay 48 of the two bays provided within an opening 50 of the frame structure 40.

The side walls 47, extending upward from opposite sides of the bracket platform 28, are spaced apart at a distance emulating the width of a standard 5¼-inch electronic device, with the outer surfaces 51 of the side walls 47 being separated from one another by the width of a standard 5¼-inch device. In this way, the adapter bracket 10 can be readily installed in the bay 48 of the frame structure 40, which is configured for the installation of standard 5¼-inch devices. On the other hand, the tabs 26 extending upward from the bracket platform 28 form mounting structures including the tabs 26 and the grommets 24, with the inner surfaces 52 of the grommets forming inner surfaces of the mounting structures. These inner surfaces 52 are separated by a distance equal to the width of a conventional 3½-inch device. Preferably, the distance between the inner surfaces 52 of each pair of grommets 24, on one side of the drive device 12, is the same distance from the closer outer surface 51 of a side wall 47 as the inner surfaces 52 of the other pair of grommets 24 is from the outer surface 51 of the other side wall 47. In this way, the drive device 12 is mounted centrally within the bay 48 of the frame structure 40.

Figure 2:
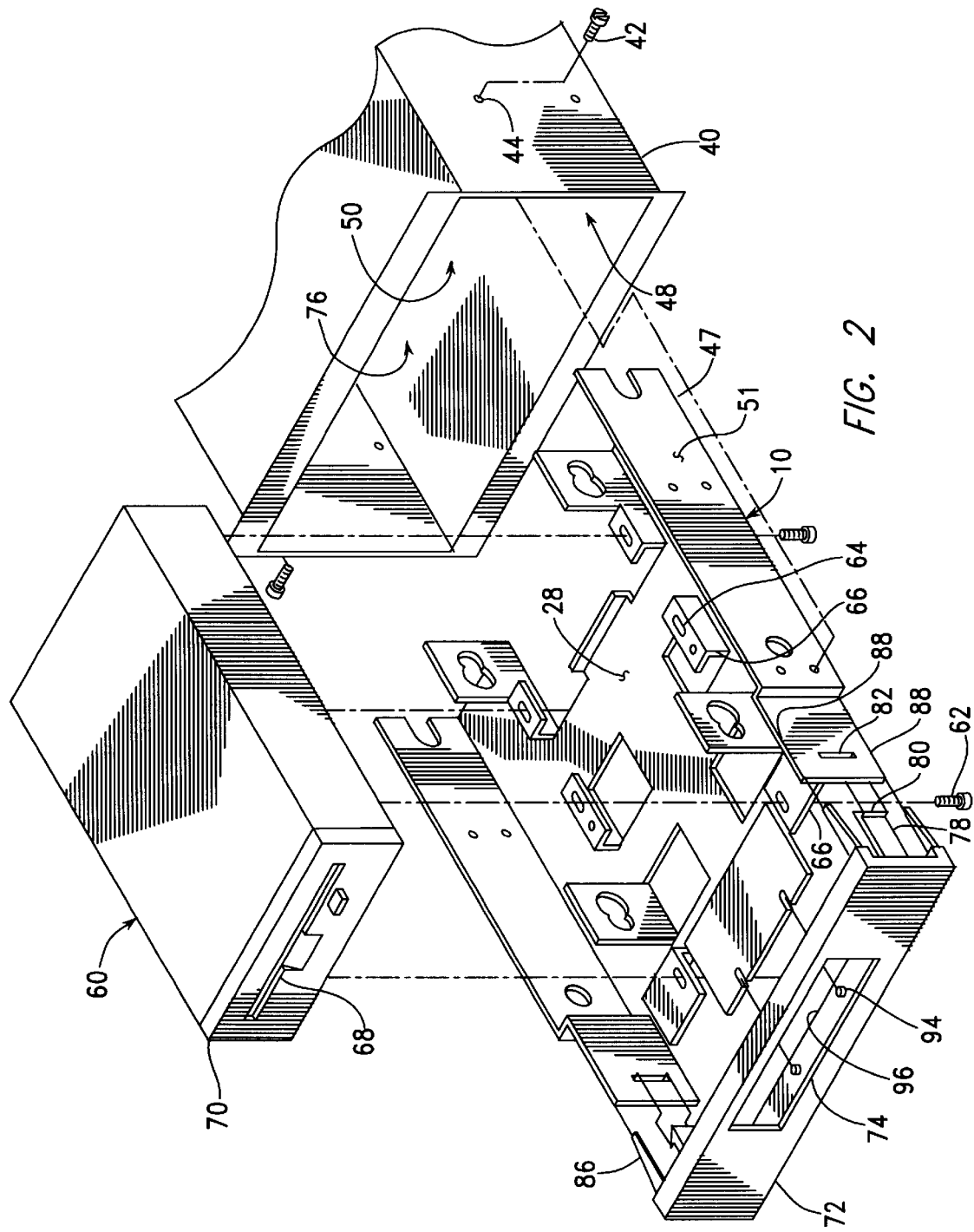
FIG. 2 is a perspective view of the adapter bracket FIG. 1, shown in an exploded relationship with a 3½-inch floppy diskette drive, hardware for mounting the diskette drive from its bottom, a bezel and a computer structure providing a bay configured to accept a 5¼-inch drive, and the frame structure of FIG. 1.

FIG. 2 is a perspective view of the adapter bracket 10, in an exploded relationship with a 3½-inch diskette drive 60 to be installed thereon, with screws 62 used for this installation, and with the frame structure 40 into which the adapter bracket 10 is subsequently installed. The adapter bracket 10 also includes a pattern of holes 64 for mounting the 3½-inch drive device 60 by means of threaded holes (not shown) extending upward from a bottom surface of the drive device. Each of these holes 64 is disposed within a tab 66 extending along a device-mounting plane offset upward from the bracket platform 28.

Since the diskette drive 60 uses removable media in the form of magnetic diskettes, which must be inserted and removed through a slot 68 in the front cover 70 of the diskette drive 60, a bezel 72 having an aperture 74 through which the removable media can pass is used to cover an opening in the front of the bay 76 provided within the frame structure 40. Since this opening must be wide enough to permit the installation of a 5¼-inch device within the bay 76, the bezel 72 is substantially wider than the diskette drive 60.

The bezel 72 is fastened to the adapter bracket 10 by means of a pair of flexible latching tabs 78 having tooth portions 80 snapping into slots 82 of bezel-mounting tabs 84 extending forward from the side walls 47. The bezel 72 also includes four guiding tabs 86, which extend along outer edges 88 of the tabs 86.

Additionally, the bezel 72 is supported by an intermediate tab 90, extending forward from the platform portion 28, with slots 92 in the tab 90 engaging protrusions 94 extending from a ledge 96 of the bezel. Alternately, screws (not shown) may be used to attach the ledge 96 to the tab 90.

This type of bezel may alternately be used with other types of removable media, such as compact disk devices and tape cassette devices. However, in the case of a device, such as a hard drive, not using removable media, the adapter bracket 10 is generally not required to mount a bezel, since a solid bezel (without an aperture) supplied with the computing system is used instead.

Preferably, the adapter bracket 10 is stamped and formed from a steel sheet.

While the invention has been described and shown as a device for mounting a horizontally oriented drive device, with its shortest dimension extending vertically, in a horizontally oriented bay, it is understood that the invention can be readily used for mounting a vertically oriented drive device, with its shortest dimension extending horizontally, in a vertically oriented bay.

While the invention has been described in its preferred forms or embodiments with some degree of particularity, it is understood that this description has been given only by way of example, and that numerous changes in the details of construction, fabrication and use, including the arrangement of parts, may be made without departing from the spirit and scope of the invention.

What is claimed is:

1. An adapter bracket for mounting a first electronic device, having a first width, in a space in a frame structure for a second electronic device, having a second width, larger than said first width, wherein said adapter bracket comprises:
    a platform portion;
    first and second wall portions extending upward along opposite sides of said platform portion, wherein outer surfaces of said first and second wall portions are spaced apart by said second width;
    first and second mounting structures extending upward from said platform portion between said first and second wall portions, wherein inner surfaces of said first and second wall portions are spaced apart by said first width;
    a first pattern of mounting holes within said first mounting structure for attaching said first electronic device to said adapter bracket by screws extending through said first pattern of mounting holes into holes within a first side of said first electronic device; and
    a second pattern of mounting holes within said second mounting structure for attaching said first electronic device to said adapter bracket by screws extending through said second pattern of mounting holes into holes within a second side of said first electronic device.

2. The adapter bracket of claim 1, wherein
    said first mounting structure includes a first grommet, composed of an elastomeric material, and a first side mounting tab extending upward from said platform holding said first grommet,
    said inner surface of said first mounting structure extends along an inner surface of said first grommet,
    a first mounting hole within said first pattern of mounting holes extends through said first grommet,
    said second mounting structure includes a second grommet, composed of an elastomeric material, and a second side mounting tab extending upward from said platform holding said second grommet,
    said inner surface of said second mounting structure extends along an inner surface of said second grommet, and
    a second mounting hole within said second pattern of mounting holes extends through said second grommet.

3. The adapter bracket of claim 2, wherein
    said first mounting structure additionally includes a third grommet, composed of an elastomeric material, and a third side mounting tab extending upward from said platform holding said third grommet,
    said inner surface of said first mounting structure additionally extends along an inner surface of said third grommet,
    a third mounting hole within said first pattern of mounting holes extends through said third grommet,
    said second mounting structure includes a fourth grommet, composed of an elastomeric material, and a fourth side mounting tab extending upward from said platform holding said fourth grommet,
    said inner surface of said second mounting structure additionally extends along an inner surface of said fourth grommet, and
    a fourth mounting hole within said second pattern of mounting holes extends through said fourth grommet.

4. The adapter bracket of claim 3, wherein said mounting holes within said grommets are located to hold said first electronic device spaced above said platform portion.

5. The adapter bracket of claim 3, wherein
    each of said side mounting tabs extending upward includes a scalloped hole having a first arcuate surface of a first radius and a second arcuate surface of a second radius, larger than said first radius,
    each of said grommets includes outer peripheral surfaces extending around opposite ends of said grommet and a groove extending between said outer peripheral surfaces,
    each of said grommets is installed within a corresponding scalloped hole by sliding an outer peripheral surface of said grommet through said second arcuate surface of said corresponding scalloped hole and by sliding said grommet to bring said groove in said grommet into contact with said first arcuate surface of said corresponding scalloped hole.

6. The adapter bracket of claim 1, wherein
    said inner surface of said first mounting structure is offset from said outer surface of said first wall portion through a first distance; and
    said inner surface of said second mounting structure is offset from said outer surface of said second wall portion through a distance equal to said first distance.

7. The adapter bracket of claim 1, additionally comprising:
    a third mounting structure extending along said platform portion between said first and second mounting structures; and
    a third pattern of mounting holes within said third mounting structure for attaching said first electronic device to said adapter bracket by screws extending through said third pattern of mounting holes into holes within a lower surface of said first electronic structure.

8. The adapter bracket of claim 7, wherein said third mounting structure includes a plurality of bottom mounting tabs extending upward from said platform portion and along a plane extending at an offset distance above said platform portion.

9. The adapter bracket of claim 8, wherein said mounting holes within said grommets are located to hold said first electronic device spaced above said third mounting structure.

10. The adapter bracket of claim 7, wherein said third pattern of mounting holes includes a first plurality of mounting holes offset through a third offset distance from said inner surface of said first mounting structure and a second plurality of mounting holes offset through an offset distance equal to said third offset distance from said inner surface of said second mounting structure.

11. The adapter bracket of claim 1, wherein said first and second wall portions include a fourth pattern of mounting holes for attachment of said adapter bracket within said space in said frame structure.

12. Apparatus comprising:
a first electronic device, having a first width;
a frame structure forming a device bay for mounting a second electronic device, wherein said device bay has a second width, substantially larger than said first width; and
an adapter bracket for holding said first electronic device, wherein said adapter bracket comprises:
a platform portion;
first and second wall portions extending upward along opposite sides of said platform portion, wherein outer surfaces of said first and second wall portions are spaced apart by said first width, and wherein said first wall portion is attached to said device bay within said frame structure;
first and second mounting structures extending upward from said platform portion between said first and second wall portions, wherein inner surfaces of said first and second wall portions are spaced apart by said second width;
a first pattern of mounting holes within said first mounting structure for attaching said first electronic device to said adapter bracket by screws extending through said first pattern of mounting holes into holes within a first side of said first electronic device; and
a second pattern of mounting holes within said second mounting structure for attaching said first electronic device to said adapter bracket by screws extending through said second pattern of mounting holes into holes within a second side of said first electronic device.

13. The apparatus of claim 12, wherein
said first mounting structure includes a first grommet, composed of an elastomeric material, and a first side mounting tab extending upward from said platform holding said first grommet,
said inner surface of said first mounting structure extends along an inner surface of said first grommet,
a first mounting hole within said first pattern of mounting holes extends through said first grommet,
said second mounting structure includes a second grommet, composed of an elastomeric material, and a second side mounting tab extending upward from said platform holding said second grommet,
said inner surface of said second mounting structure extends along an inner surface of said second grommet, and
a second mounting hole within said second pattern of mounting holes extends through said second grommet.

14. The apparatus of claim 13, wherein
said first mounting structure additionally includes a third grommet, composed of an elastomeric material, and a third side mounting tab extending upward from said platform holding said third grommet,
said inner surface of said first mounting structure additionally extends along an inner surface of said third grommet,
a third mounting hole within said first pattern of mounting holes extends through said third grommet,
said second mounting structure includes a fourth grommet, composed of an elastomeric material, and a fourth side mounting tab extending upward from said platform holding said fourth grommet,
said inner surface of said second mounting structure additionally extends along an inner surface of said fourth grommet, and
a fourth mounting hole within said second pattern of mounting holes extends through said fourth grommet.

15. The apparatus of claim 14, wherein said mounting holes within said grommets are located to hold said first electronic device spaced above said platform portion.

16. The apparatus of claim 14, wherein
each of said side mounting tabs extending upward includes a scalloped hole having a first arcuate surface of a first radius and a second arcuate surface of a second radius, larger than said first radius,
each of said grommets includes outer peripheral surfaces extending around opposite ends of said grommet and a groove extending between said outer peripheral surfaces,
each of said grommets is installed within a corresponding scalloped hole by sliding an outer peripheral surface of said grommet through said second arcuate surface of said corresponding scalloped hole and by sliding said grommet to bring said groove in said grommet into contact with said first arcuate surface of said corresponding scalloped hole.

17. The apparatus of claim 12, wherein
said inner surface of said first mounting structure is offset from said outer surface of said first wall portion through a first distance; and
said inner surface of said second mounting structure is offset from said outer surface of said second wall portion through a distance equal to said first distance.

18. The apparatus of claim 12, additionally comprising:
a third mounting structure extending along said platform portion between said first and second mounting structures; and
a third pattern of mounting holes within said third mounting structure for attaching said first electronic device to said adapter bracket by screws extending through said third pattern of mounting holes into holes within a lower surface of said first electronic structure.

19. The apparatus of claim 18, wherein
said third mounting structure includes a plurality of bottom mounting tabs extending upward from said platform portion and along a plane extending at an offset distance above said platform portion.

20. The apparatus of claim 19, wherein said mounting holes within said grommets hold said first electronic device spaced above said third mounting structure.

21. The apparatus of claim 18, wherein said third pattern of mounting holes includes a first plurality of mounting holes offset through a third offset distance from said inner surface of said first mounting structure and a second plurality of mounting holes offset through an offset distance equal to said third offset distance from said inner surface of said second mounting structure.

22. The apparatus of claim 18, additionally comprising a bezel, attached to said adapter bracket, covering an open portion of said device bay for mounting said second electronic device.

23. The apparatus of claim 22, wherein said adapter bracket includes slotted bezel mounting tabs extending forward from said first and second wall portions and a bezel support tab extending forward from said platform portion, and said bezel includes a pair of flexible latching tabs engaging slots within said slotted bezel mounting tabs and a ledge engaging said bezel support tab.

24. The apparatus of claim 22, wherein said first electronic device includes a removable medium and a front surface having a slot for insertion and removal of said removable medium; and said bezel includes a slot extending adjacent said slot for insertion and removal of said removable medium.

25. The apparatus of claim 12, wherein said first and second wall portions include a fourth pattern of mounting holes;

and said adapter bracket is attached within said space in said frame structure by screws extending into holes within said fourth pattern of mounting holes.

* * * * *